United States Patent
Römer et al.

(10) Patent No.: US 6,817,212 B1
(45) Date of Patent: Nov. 16, 2004

(54) SKULL POT FOR MELTING OR REFINING GLASS OR GLASS CERAMICS

(75) Inventors: Hildegard Römer, Karben (DE); Uwe Kolberg, Mainz-Kastel (DE); Guido Räke, Bingen (DE); Werner Kiefer, Mainz (DE); Michael Kohl, Ingelheim (DE); Wolfgang Schmidbauer, Mainz (DE)

(73) Assignee: Schott GLAS, Mainz (DE)

( * ) Notice: Subject to any disclaimer, the term of this patent is extended or adjusted under 35 U.S.C. 154(b) by 264 days.

(21) Appl. No.: 10/049,936

(22) PCT Filed: Aug. 16, 2000

(86) PCT No.: PCT/EP00/07986

§ 371 (c)(1),
(2), (4) Date: Apr. 29, 2002

(87) PCT Pub. No.: WO01/14264

PCT Pub. Date: Mar. 1, 2001

(30) Foreign Application Priority Data

Aug. 21, 1999 (DE) .......................... 199 39 780

(51) Int. Cl.⁷ .............................. C03B 5/00; C03B 7/00
(52) U.S. Cl. ................ 65/374.12; 65/347; 65/346; 65/356; 65/355; 373/30; 373/156
(58) Field of Search ............... 65/374.12, 347, 65/346, 356, 355; 373/30

(56) References Cited

U.S. PATENT DOCUMENTS

| | | | |
|---|---|---|---|
| 4,049,384 A | 9/1977 | Wenckus et al. | ......... 23/273 SP |
| 4,687,646 A | 8/1987 | Mateika et al. | ............. 422/248 |
| 5,367,532 A | 11/1994 | Boen et al. | ................. 373/156 |
| 6,058,741 A | 5/2000 | Sobolev et al. | ............... 65/335 |

FOREIGN PATENT DOCUMENTS

| | | |
|---|---|---|
| DE | 33 16 546 | 4/1984 |
| EP | 0 528 025 | 6/1996 |
| FR | 2 768 257 | 3/1999 |
| RU | 2132097 | 6/1999 |

OTHER PUBLICATIONS

Lifanov F.A. et al., "A Crucible–Type Induction Furnace for Melting Glass", Glass and Ceramics, US, Counsultants Bureau, New York, vol. 48, No. 7, Jul. 1991, pp. 288–290.
Kushnikov V.V. et al., "Induction Melting in a Cold Crucible for Immobilization of Plutonium–Containing Wastes", Atomic Energy, U.S. Consultants Bureau, New York, vol. 83, No. 5, Nov. 1997, pp. 801–806.
Petrov, Yu. B et al., "Continuous Casting Glass Melting in a Cold Crucible Induction Furnace", XV. Int. Congress on Glass, 1989 Proceedings, vol. 3a, Jul. 1989, pp. 72–77.
Moulin, J. et al., "Nouveaux Developpements dans la fusion electrique des verres refractaires", Verres et Refractaires, Articles Originaux, vol. 26, No. 4–5, Jul. 1972, pp. 123–127.
Copy of International Search Report dated Nov. 7, 2000 in PCT/EP00/07986.
Copy of Office Action in corresponding German Application No. 199 39 780.5 and English translation of same.

*Primary Examiner*—Peter Chin
*Assistant Examiner*—Mark Halpern
(74) *Attorney, Agent, or Firm*—Baker & Daniels

(57) ABSTRACT

The invention relates to a skull pot for melting or refining glass or glass ceramics, comprising a pot wall (1), a pot base, and an induction coil (3) which surrounds said pot wall and through which high-frequency energy can be coupled into the contents of the pot. The pot wall is made up of a ring of metal pipes (1.1) which can be connected to a cooling medium, slot-type intermediate chambers being provided between adjacent metal pipes. The pot base has a run-off for the melt. The metal pipes (1.1) that form the pot wall (1) arm short-circuited with each other above the base in order to increase the degree of efficiency of the skull pot and especially, in order to even out the temperature profile of the melt throughout the depth of the melt.

8 Claims, 2 Drawing Sheets

SKULL POT FOR MELTING OR REFINING GLASS OR GLASS CERAMICS

Figure 2:
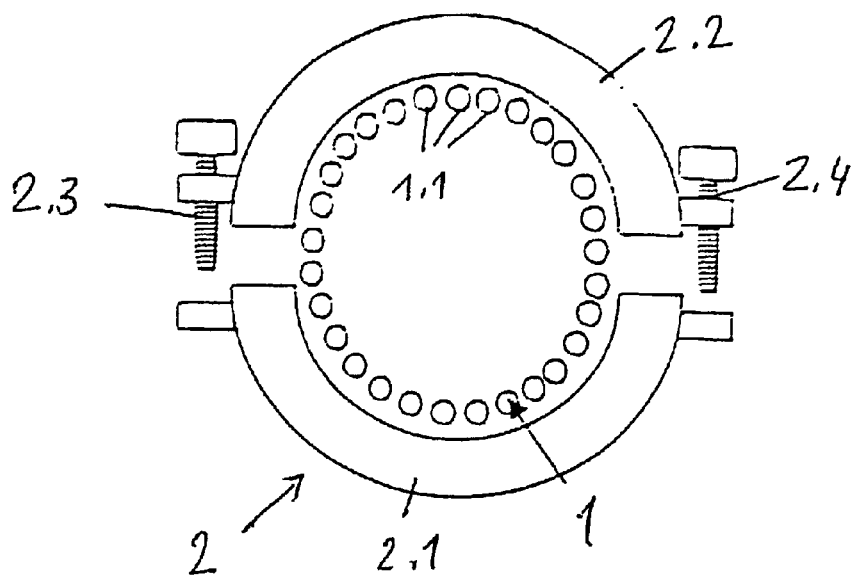

The invention concerns a so-called skull pot for melting or refining glass or glass ceramics.

Such pots are surrounded by a pot wall, which is normally cylindrical. It consists of a ring of vertical metal pipes, where a gap remains between adjacent pipes. The base of the pot may also be constructed of metal pipes, but it may also consist of fireproof material.

The heat source involves an induction coil, which surrounds the pot wall and through which high-frequency energy can be coupled into the contents of the pot.

An example of such a skull pot was made public by EP 0 528 025 B1.

The skull pot operates as follows: The pot is filled by batch or cutlet or a mixture thereof. The glass or the melt needs to be preheated initially to achieve a certain minimum conductivity. This preheating is often accomplished by blowpipe heating. Once the coupling temperature is reached, the additional input of energy involves irradiation with high frequency energy. It is also possible to heat the melt by burners, which heat the melt from above, in addition to the heating via high frequency energy. The additional heating of the melt surface may also be done by electrical heating elements.

A margin layer of solidified melt forms on the cooled pot wall, which consists of metal pipes, during operation. This protects the pot wall from corrosion from aggressive or hot melt. This cold margin layer may either be glassy or crystalline, depending on the glass melt.

Likewise, the base layer is also cold, because the base is cooled just as the wall is cooled. A glassy or crystalline cold base layer is formed there as well. This is not advantageous for run-off of the melt via a base drain. To be specific, either a hole would have to be punched in the solidified base layer or it would have to be dissolved by means of additional heat sources. Here the crystalline layer acts as a nucleating agent for the melt rushing past, which is undesirable.

The high frequency energy can be used only for the heating of the skull pot interior. However, it is not possible to use it for targeted heating of the cooled base layer. If the induction heating system were to heat the base layers, these layers would lose heat by the action of the base coolant. This would reduce the energy efficiency, compared to the un-cooled hot center zone of the melt.

It could be argued that the high frequency input should be raised sufficiently overall, such that the temperature of the base area exceeds the upper divitrification temperature. Admittedly, this would solve the problem of achieving run-off. However, this would also overheat the melt in the center of the skull pot. This could lead to a shift of the synthesis by the selective evaporation of certain glass components, which would induce fluctuations in the refractive characteristics and streaks.

Thus, it needs to be noted that the relatively low temperatures along the bases of conventional skull pots are detrimental.

It may also be just as detrimental if the surface area of the melt in refining vessels is relatively cold. After all, the cold surface layers of the melt would restrict bubbles from rising and bursting.

But high surface temperatures of the melt are desirable not only during refining, but also during melting, because they favor quick melting.

The invention focuses on finding measures to modify the skull pot in such a way that the temperature of the melt in various segments on various geodesic levels can be controlled, given a constant energy input during the production process. Thus, it should be possible, for instance, to induce an especially significant increase of the temperature of the melt in the lower or in the center or in the surface area of the pot. As an alternative, it should be equally possible to generate an improved homogeneity of the temperature across all levels of the entire pot.

This task is solved by the characteristics of Claim 1.

The inventors have realized the following:

The high frequency radiation is also absorbed by the metallic cooling pipes, but to a lesser degree. This induces voltage differentials among the cooling pipes, which are isolated electrically from each other. This generates arcing between individual cooling pipes.

This is particularly noticeable if the solidified cold layer of glass along the wall is thinned significantly due to high melting temperatures.

In that instance, the full induction voltage acts on these layers, because the conductivity of the hot melt and the conductivity of the cooling pipes is significantly higher than the conductivity of the cooled wall layer of glass. The reduced wall layer thickness leads to high field intensities and thus to the generation of the aforementioned arcing. The arcing damages the metal cooling pipes and will destroy the pot, in the long run.

The invention, specifically the inclusion of a short-circuit ring, will prevent the arcing. This will increase the useful life of the pot.

It will be necessary in very large skull pots with long cooling pipes to include a short-circuit ring at the top and one at the bottom of the pipes. A single short-circuit will not suffice to defuse the high frequency induction voltages.

This applies particularly to melts, where there is no stable, crystalline and electrically isolating margin layer between melt and skull wall. The use of a double short-circuit allows for the precise fine-tuning of the field distribution, and thus the temperature distribution, by varying the distance at which the short occurs from the center of the melt.

For example, the short may be induced near the base of the pot on a variable basis by not connecting the cooling pipes of the skull pot directly, but rather extending the cooling pipes downward by threaded pipes, where an adjustable short-circuit ring is attached to the threaded pipes. The optimal position for the short can then be selected, depending on the melting phase (melting, refining or casting). A comparable, height-adjustable modification of the short can be positioned on the upper pot rim as well, of course.

For very tall pots, a second short-circuit may be required under certain circumstances, but a second short-circuit may also make it feasible to pull one of the two short-circuits a significant distance away from the pot. This applies particularly to the melting phase of the process, when relative low melting temperatures need to be used and when the cold glass margin layer forms normally even in critical glass systems.

However, the inventors have also realized the following:

When the metal cooling pipes are short-circuited together, the location of the short tends to push the high frequency field either upwards or downwards. If the short is at the base of the pot, the displacement is towards the top. If the short is in the upper segment, the displacement is towards the base. When the field is pushed towards the top, the temperature of the surface layer of the melt is increased. When the field is pushed towards the base, the temperature of the base layer is increased. Thus, it is feasible to increase the temperature of the melt in a specific layer, or conversely to achieve a homogeneous distribution of temperature, by adjusting the location of the short.

The short would normally be adjusted towards the base during refining. In this case, the high frequency field is pushed towards the top. The surface layer of the melt is heated to particularly high temperatures. The gas bubbles contained in the melt willingly ascend, easily permeate the surface layer and burst.

During melting, it may also be advantageous to move the short towards the base. This leads to particularly effective heating of the developing surface layer, which facilitates melting.

The run-off should be free of crystals during casting. The melt should have a viscosity of roughly $10^4$ dPas in the run-off area, where the melt in higher pot layers does not need to be heated to refining temperatures, which would lead to thermal reboiling. The short should be moved to the upper area of the pot in order to keep the run-off free of crystals during casting. In this case, the high-energy field is pushed downwards, so that the run-off level is heated particularly vigorously.

It is most advantageous, if the short is caused by a metallic ring, which connects the metal cooling pipes by an electrically conductive medium. The short, regardless of its physical nature, must be located somewhere along the length of the cooling pipes, i.e. between the base of the skull pot and the upper terminus of the cooling pipes. If the short is located outside of this range, it is not effective for high-frequency voltage, because the inductive resistance of such a "wire loop" is too large. U.S. Pat. No. 4,049,384 describes a skull pot that consists of two modules. Each module contains a string of cooling pipes, which are arrayed in a semi-circle and which are firmly attached to a metal base plate that also has a semi-circular shape. The two base plates are joined with an electrically isolating spacer, to avoid a short between the modules, as the patent descriptions points out at length. This is consistent with the historic presumption that a short must be avoided, contrary to the basic concept of the present invention.

The fear may arise that a short would consume more high-frequency energy in the skull pot itself or that the high-frequency field would not penetrate the interior of the pot. Such fears have not been shown to be realistic. The additional consumption of high-frequency energy is minimal. Thus, the invention has major advantages, but just about no disadvantages.

The increase in mechanical stability of the pot, given the construction according to the invention with a short-circuit ring, is an additional advantage.

Figure 1:
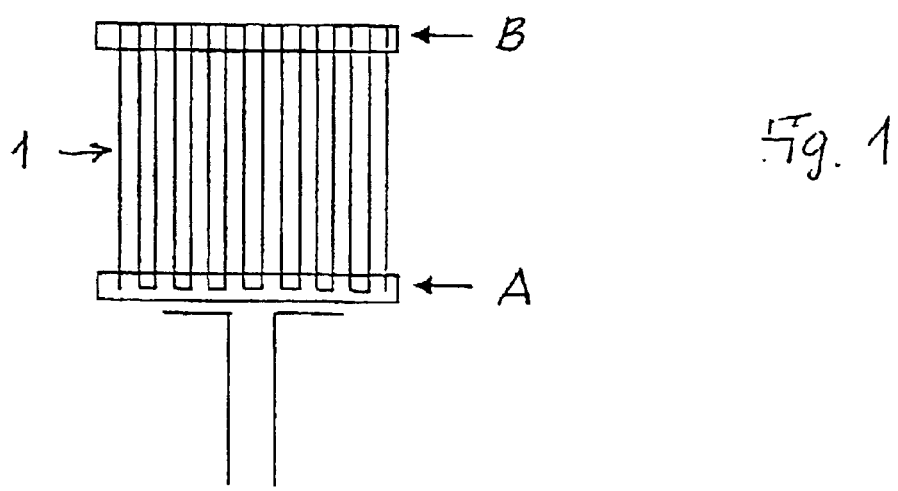

The invention is described in more detail by reference to the drawings. They show, in detail, the following:

FIG. 1 A skull pot in a schematic view in a vertical and central cross section.

FIG. 2 The short-circuit ring, open.

Figure 3:
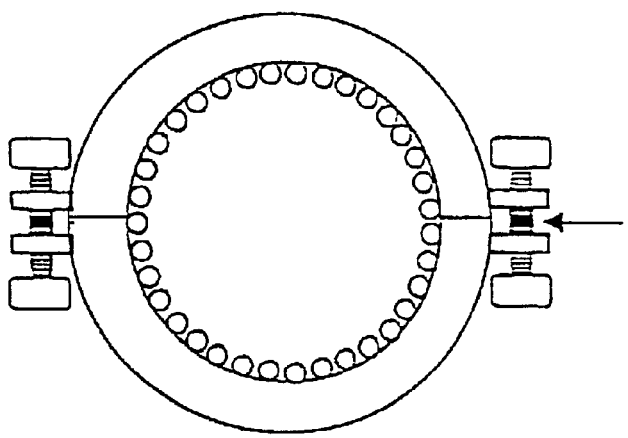

FIG. 3 The short-circuit ring, closed

Figures 4, 5:
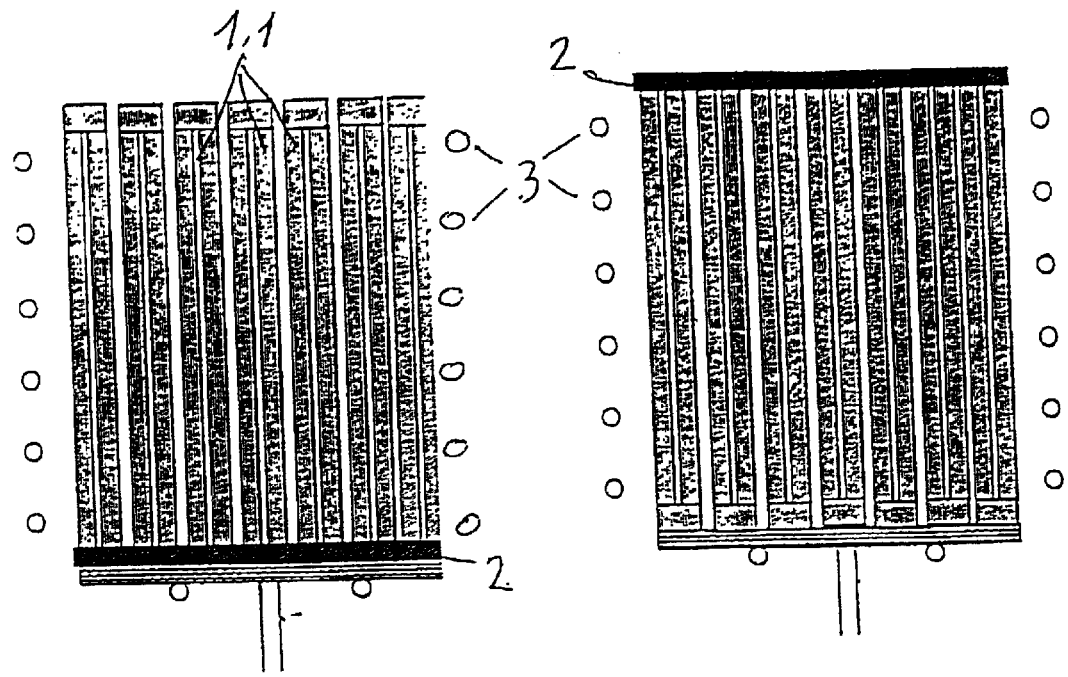

FIG. 4 The skull pot of FIG. 1 with a short-circuit ring at the base.

FIG. 5 The skull pot of FIG. 1 with a short-circuit ring at the top.

Figure 6:
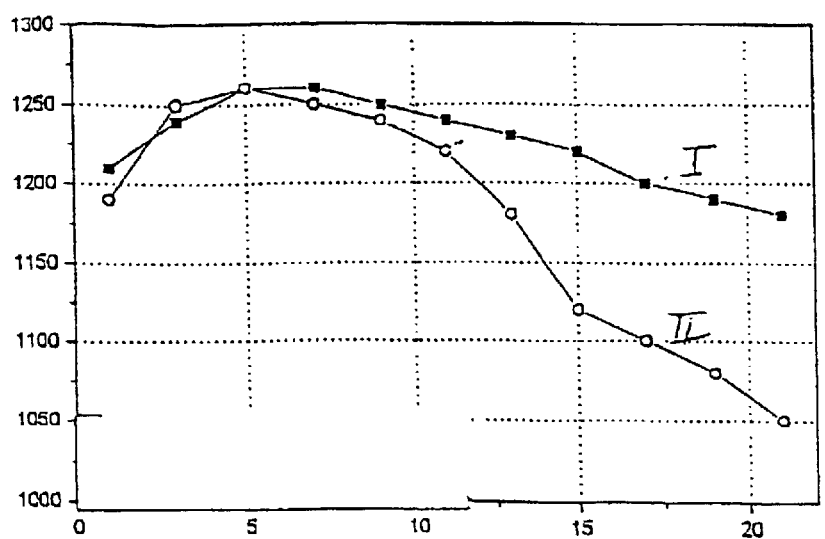

FIG. 6 A diagram of the variation in temperature in the melt.

The skull pot shown in the Figures serves to melt or refine glass or glass ceramics, particularly glass batch or so-called cullet or a mixture thereof.

The skull pot has wall 1. This consists of a circle of vertical metal pipes, which are connected to each other in an electrically conductive fashion and which are connected to a cooling medium, such as water.

The base of skull pot 1.1 consists of a quartz plate. This is cooled as well, specifically by air emitting from pipes.

The wall is surrounded by an induction coil. This is a component of a high frequency apparatus, by which high frequency energy is coupled into the content of the skull pot.

The two arrows A and B show positions A and B, in which the short-circuit unit may be installed.

FIGS. 2 and 3 show the construction of the short-circuit unit. It includes a ring, formed by two semi-circular segments 2.1, 2.2 and two tensioning units 2.3, 2.4. As can be seen, the two tensioned ring segments 2.1, 2.2 surround the wall 1, which is constructed of a number of metal pipes 1.1, which contain a cooling medium and which are arranged in a circle.

In the view shown in FIG. 3, the short-circuit unit is short-circuited. The tensioning units 2.3, 2.4 are attached. The semi-circular segments 2.1, 2.2 touch the metal pipes 1.1 and are thus conducting electricity. The semi-circular segments 2.1, 2.2 and the metal pipes 1.1 are designed and installed in such a manner that the semi-circular segments make firm contact with the metal pipes 1.1 in this situation.

The views shown in FIG. 4 and 5 also show a skull pot with metal pipes 1.1. Metal pipes 1.1 are surrounded by the coils 3 of a high-frequency coil. The short-circuit unit 2 is shown in the embodiment of FIG. 4 in the base area, specifically directly above the base of the skull pot. It is shown in the embodiment of FIG. 5 at the upper ends of metal pipes 1.1.

The embodiment shown in FIG. 4 is particularly advantageous for the refining of glass melt. The short-circuit unit 2 deflects the high-frequency field more into the direction of the surface of the melt. This heats the surface of the melt relatively more. Consequently, gas bubbles may easily permeate the surface layer and burst at the surface.

The embodiment shown in FIG. 5 achieves a homogeneous distribution of temperature. The high-frequency field is deflected strongly towards the base. This heats the melt in the base layer more than in the surface layer. This generates a convection of the melt, where the hot melt ascends from the base layer, leading to a ready mixing of relatively hot and relatively cool melt and thus to homogenization. This also assures that crystallization is precluded in the base layer, so that the melt can be run off through the runoff valve in the base without any problems.

FIG. 6 shows the depth profile of an optical glass melt in a skull pot, specifically in two curves. The y-axis shows the temperature in degrees Celsius and the x-axis shows the depth of the melt, in cm, at which the temperature is measured.

Curve I shows the relationship between temperature and depth of the melt when the short-circuit ring is attached at the upper free ends of the cooling pipes. Curve II shows the relationship between temperature and depth when the short-circuit ring is located in the base area.

It is easily discernable that the use of a short-circuit ring in the upper area generates a better result, when the skull pot is used for melting. The temperature of the melt in the base layer and the temperature of the melt in the surface layer do not differ excessively.

The principle of homogenization of the temperature by positioning the electrical short at the upper rim of the skull pot was tested by means of a modified skull pot with a platinum runoff with optical glass consisting primarily of the ingredients silicon oxide, zinc oxide, potassium oxide, and sodium monoxide.

A skull pot with a diameter of 20 cm and a melting depth of 22 cm was used for melting. The glass was preheated by a burner and was coupled at about 900° C. to the high-energy field, so that the burner could be turned off. The high-energy frequency amounted to 1 MHz. The required output varies between 20 and 40 kW, depending on the temperature of the melt. A melting temperature of 1100° C. was specified for the casting of the glass, which required an output of 25 kW.

The skull pot was constructed twice, once with the short-circuit at the base and once with the short-circuit at the top. The base includes a platinum runoff flange, which is resistance-heated and by which the melt may be run off for an evaluation of the quality of the melt.

The temperature distribution in the melt may be measured by thermocouple instrumentation, with leads for the thermocouple elements from the high-energy zone with feedthrough capacitors and optocouplers. The filtered thermal signal can be captured by standard measurement devices.

Measurements of the vertical temperature distribution in the center of the pot shows the clear advantage of positioning the short-circuit at the top. Compared to the standard structure, the temperature distribution is significantly more homogeneous. This has several advantages:

First, the homogeneous temperature distribution is the precondition for the production of optically homogeneous glass. Second, casting via a base runoff in a situation of homogeneous temperature distribution created by a short-circuit at the top yields noticeably improved results, because there is no interference from a base layer of crystals, which can cause contamination of the final product due to crystals. Runoff in this manner does not require overheating the surface layer of the pot in order to guarantee that the base layer is still liquid. Casting can be accomplished at significantly lower and more moderate temperatures by use of this modification of the pot.

What is claimed is:

1. Skull pot for the melting or the refining of glass or glass ceramics, comprising:

a pot wall made up of a ring of metal pipes connected to a cooling medium, with slit-like gaps between neighboring metal pipes, all of the metal pipes short circuited with each other;

a pot base having a runoff for the melt; and an induction coil which surrounds the pot wall and through which high-energy frequency can be coupled into the content of the pot.

2. Skull pot according to claim 1, wherein the short-circuit is designed for the area of the upper ends of the metal pipes.

3. Apparatus according to claim 2, wherein the short-circuit includes a metal pipe connected to a cooling medium.

4. Skull pot according to claim 1, wherein the short-circuit is designed for the area of the base.

5. Apparatus according to claim 4, wherein the short-circuit includes a metal pipe connected to a cooling medium.

6. Skull pot according to claim 1, wherein the short-circuit is designed for the area of the upper ends of the metal pipes and for the area of the base.

7. Skull pot according to claim 6, wherein the height of the short-circuit can be adjusted, particularly in the presence of two short-circuits.

8. Apparatus according to claim 1, wherein the short-circuit includes a metal pipe connected to a cooling medium.

* * * * *